US012737014B2

(12) United States Patent
Edmonds et al.

(10) Patent No.: US 12,737,014 B2
(45) Date of Patent: Sep. 15, 2026

(54) ELECTRONIC DEVICE HAVING CLUTCH BARREL ANTENNA SLOT

(71) Applicant: Apple Inc., Cupertino, CA (US)

(72) Inventors: Trevor J Edmonds, San Francisco, CA (US); Michael J Williams, Campbell, CA (US); Nikolaos Chiotellis, San Jose, CA (US); Joel D Barrera, Cedar Park, TX (US); Marc Soriano Baliarda, San Jose, CA (US); Ayoub Yari Boroujeni, Redwood City, CA (US); Jerzy S Guterman, Sunnyvale, CA (US); Mahmoud R Amini, Redwood City, CA (US); Kevin M Robinson, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 397 days.

(21) Appl. No.: 18/477,202

(22) Filed: Sep. 28, 2023

(65) Prior Publication Data

US 2025/0110531 A1 Apr. 3, 2025

(51) Int. Cl.
*G06F 1/16* (2006.01)
*H01Q 13/10* (2006.01)

(52) U.S. Cl.
CPC ........... *G06F 1/1681* (2013.01); *H01Q 13/10* (2013.01)

(58) Field of Classification Search
CPC ..... G06F 1/1681; G06F 1/1616; H01Q 13/10; H01Q 1/2266
USPC ....................................................... 455/575.7
See application file for complete search history.

(56) References Cited

U.S. PATENT DOCUMENTS 7,859,469 B1 * 12/2010 Rosener .................... H01Q 1/22 343/702
8,059,039 B2 11/2011 Ayala Vazquez et al.
9,450,289 B2 9/2016 Guterman et al.
9,531,071 B2 12/2016 Guterman et al.
9,653,777 B2 5/2017 Guterman et al.
10,268,236 B2 4/2019 Guterman et al.
10,727,590 B2 7/2020 Barrera et al.
10,978,806 B2 4/2021 Garrido Lopez et al.
(Continued)

FOREIGN PATENT DOCUMENTS

EP 2434576 A1 * 3/2012 ............. H01Q 5/378

OTHER PUBLICATIONS

U.S. Appl. No. 17/832,465, filed Jun. 3, 2022.

*Primary Examiner* — Mahendra R Patel
(74) *Attorney, Agent, or Firm* — Treyz Law Group, P.C.; Michael H. Lyons

(57) ABSTRACT

An electronic device such as a laptop computer may have an upper housing and a lower housing. The lower housing may have a clutch barrel. The upper housing may be coupled to the clutch barrel by a hinge. The lower housing may have an upper metal wall separated from the upper housing by a first gap and a lower metal wall separated from the upper housing by a second gap. The clutch barrel may include a conductor. An antenna may be formed from a radiating slot in the conductor. The radiating slot may have a tunnel extending from a first opening to a second opening in the conductor across a diameter of the conductor. The tunnel may be linear or non-linear. The tunnel may have a uniform or tapered width. The radiating slot may convey radio-frequency signals through both gaps regardless of the orientation of the upper housing.

20 Claims, 9 Drawing Sheets

(56) References Cited

U.S. PATENT DOCUMENTS

| | | | | |
|---|---|---|---|---|
| 2010/0073243 | A1* | 3/2010 | Ayala Vazquez | H01Q 1/2266 343/702 |
| 2010/0149751 | A1* | 6/2010 | Camacho | G06F 1/1698 343/702 |
| 2010/0182205 | A1* | 7/2010 | Chiang | H01Q 1/2266 343/702 |
| 2012/0026048 | A1* | 2/2012 | Vazquez | H01Q 1/38 343/725 |
| 2012/0050975 | A1* | 3/2012 | Garelli | G06F 1/181 361/679.01 |
| 2013/0321216 | A1* | 12/2013 | Jervis | H04M 1/0216 343/702 |
| 2015/0255851 | A1* | 9/2015 | Guterman | H01Q 9/42 343/702 |
| 2023/0223681 | A1 | 7/2023 | Barrera et al. | |
| 2025/0103109 | A1* | 3/2025 | Williams | G06F 1/1681 |
| 2025/0105490 | A1* | 3/2025 | Chiotellis | H01Q 1/38 |

* cited by examiner

ELECTRONIC DEVICE HAVING CLUTCH BARREL ANTENNA SLOT

FIELD

This relates generally to electronic devices, including electronic devices with wireless communications capabilities.

BACKGROUND

Electronic devices such as portable computers and cellular telephones are often provided with wireless communications capabilities and displays. To satisfy consumer demand for small form factor wireless devices, manufacturers are continually striving to implement wireless communications circuitry such as antenna components using compact structures.

It can be challenging to form electronic device antenna structures with desired attributes. In some wireless devices, the presence of conductive housing structures can impact antenna performance. Device size can also affect performance. It can be difficult to achieve desired performance levels in a compact device, particularly when the compact device has conductive housing structures.

SUMMARY

An electronic device such as a laptop computer may have an upper housing and a lower housing. The lower housing may have a clutch barrel. The upper housing may be coupled to the clutch barrel by a hinge. The upper housing may be rotatable relative to the lower housing between an open position and a closed position. The lower housing may have an upper metal wall separated from the upper housing by a first gap when the upper housing is in the open position. The lower housing may have a lower metal wall separated from the upper housing by a second gap when the upper housing is in the open position.

The clutch barrel may include a conductor. An antenna may be formed from a radiating slot in the conductor. The radiating slot may have a tunnel extending from a first opening in the conductor to a second opening in the conductor across a diameter of the conductor. The tunnel may be linear or may be non-linear. The tunnel may have a uniform width or a tapered width. The upper housing may have conductive structures with a waveguide that aligns with the radiating slot when the upper housing is in the closed position. Multiple antennas may share one or more openings in the conductor. The radiating slot may convey radio-frequency signals through both gaps regardless of the orientation of the upper housing.

DETAILED DESCRIPTION

Figure 1:
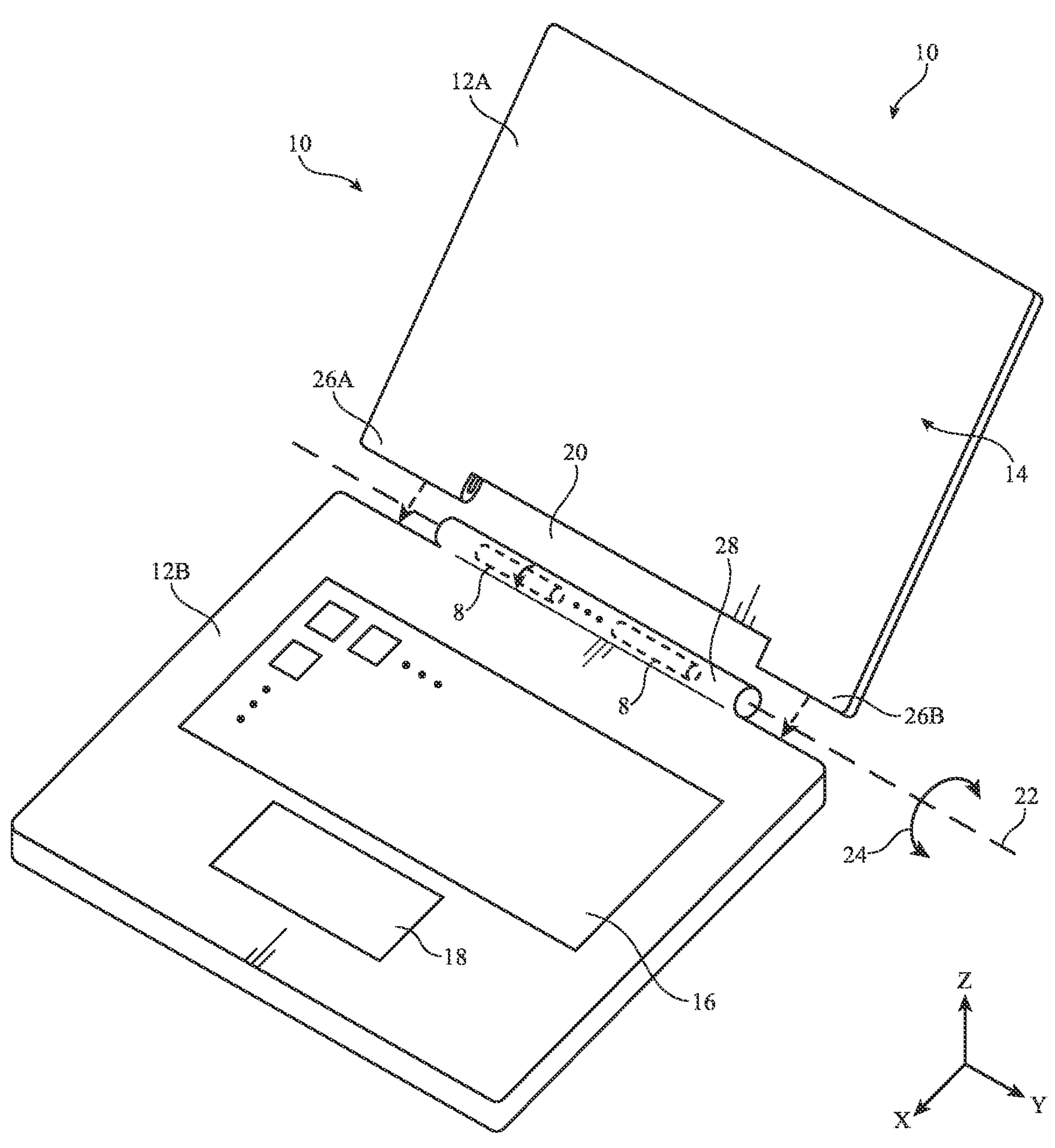
FIG. 1 is a perspective view of an illustrative electronic device such as a laptop computer having a clutch barrel in accordance with some embodiments.

An electronic device such as electronic device 10 of FIG. 1 may contain wireless circuitry. For example, electronic device 10 may contain wireless communications circuitry that operates in long-range communications bands such as cellular telephone bands and wireless circuitry that operates in short-range communications bands such as the 2.4 GHZ Bluetooth® or other wireless personal area network (WPAN) bands and the 2.4 GHZ and 5 GHz Wi-Fi® band or other wireless local area network (WLAN) bands (sometimes referred to as IEEE 802.11 bands or wireless local area network communications bands). Device 10 may also contain wireless communications circuitry for performing near-field communications, communications at millimeter/centimeter wave frequencies, light-based wireless communications, satellite navigation system communications, or other wireless communications.

Device 10 may be a handheld electronic device such as a cellular telephone, media player, gaming device, or other device, may be a laptop computer, tablet computer, or other portable computer, may be a desktop computer, may be a computer display, may be a display containing an embedded computer, may be a television or set top box, wireless base station, wireless access point, home entertainment console, portable speaker, gaming accessory, wristwatch device, head-mounted display device, or other wearable device, or may be other electronic equipment. Configurations in which device 10 has a rotatable lid as in a portable (e.g., laptop) computer are sometimes described herein as an example. This is, however, merely illustrative. Device 10 may be any suitable electronic equipment.

As shown in the example of FIG. 1, device 10 may have a housing such as housing 12. Housing 12 may be formed from plastic, metal (e.g., aluminum), fiber composites such as carbon fiber, glass, ceramic, other materials, and combinations of these materials. Housing 12 or parts of housing 12 may be formed using a unibody construction in which housing structures are formed from an integrated piece of material. Multipart housing constructions may also be used in which housing 12 or parts of housing 12 are formed from frame structures, housing walls, and other components that are attached to each other using fasteners, adhesive, and other attachment mechanisms.

As shown in FIG. 1, device 10 may have input-output devices such as track pad 18 (e.g., a touch pad, mouse, other touch-based user input device) and keyboard 16 (e.g., having a set of mechanical and/or electronic-based keys and/or a touch screen display). Device 10 may also have components such as cameras, microphones, speakers, buttons, status indicator lights, buzzers, sensors, and other input-output devices. These devices may be used to gather input for device 10 and may be used to supply a user of device 10 with output. Connector ports in device 10 may receive mating connectors (e.g., an audio plug, a connector associated with a data cable such as a Universal Serial Bus cable, a data cable that handles video and audio data such as a cable that connects device 10 to a computer display, television, or other monitor, etc.).

Device 10 may include a display such a display 14. Display 14 may be a liquid crystal display (LCD), a plasma display, an organic light-emitting diode (OLED) display, an electrophoretic display, or a display implemented using other display technologies. A touch sensor may be incorporated into display 14 (e.g., display 14 may be a touch screen display) or display 14 may be insensitive to touch. Touch sensors for display 14 may be resistive touch sensors, capacitive touch sensors, acoustic touch sensors, light-based touch sensors, force sensors, or touch sensors implemented using other touch technologies.

Device 10 may have a one-piece housing or a multi-piece housing. As shown in FIG. 1, for example, electronic device 10 may be a device such as a portable computer or other device that has a two-part housing formed from an upper housing portion such as upper housing 12A and a lower housing portion such as lower housing 12B. Upper housing 12A may include display 14 and may sometimes be referred to as a display housing or lid. Lower housing 12B may sometimes be referred to as a base housing or main housing.

Housings 12A and 12B may be connected to each other using hinge structures located along the upper edge of lower housing 12B and the lower edge of upper housing 12A. For example, housings 12A and 12B may be coupled by hinges 26 such as hinges 26A and 26B that are located at opposing left and right sides of housing 12 along a rotational axis such as axis 22 (sometimes referred to herein as hinge axis 22). A slot-shaped opening such as opening 20 may be formed between upper housing 12A and lower housing 12B and may be bordered on either end by hinges 26A and 26B.

Opening 20 is sometimes also referred to herein as gap 20 or slot 20 between upper housing 12A and lower housing 12B. Hinges 26A and 26B, which may be formed from conductive structures such as metal structures, may allow upper housing 12A to rotate about axis 22 in directions 24 relative to lower housing 12B. Slot 20 extends along the rear edge of lower housing 12B parallel to axis 22. The lateral plane of upper housing (lid) 12A and the lateral plane of lower housing 12B may be separated by an angle that varies between 0° when the lid is closed to 90°, 140°, 160°, 180° or more when the lid is fully opened.

Some of the structures in housing 12 may be conductive. For example, upper housing 12A and lower housing 12B may include conductive housing structures such as metal housing walls. Lower housing 12B may include a clutch barrel along hinge axis 22 such as clutch barrel 28. Clutch barrel 28 may extend outwards from metal housing walls of lower housing 12B towards upper housing 12A (e.g., within slot 20). When upper housing 12A is attached to lower housing 12B, hinges 26A and 26B may be affixed to opposing ends of clutch barrel 28 (e.g., clutch barrel 28 may be laterally opposed to hinges 26A and 26B). Clutch barrel 28 may include springs and/or other clutch mechanisms that allow hinges 26A and 26B and thus upper housing 12A to rotate relative to lower housing 12B about hinge axis 22, while also mechanically holding upper housing 12A in place at a desired angle or orientation relative to lower housing 12B (e.g., intermediate angles between an open position and a closed position of upper housing 12A). Clutch barrel 28 may have walls that are formed from dielectric material and/or metal materials.

To ensure that antenna structures in device 10 function properly, care should be taken when placing the antenna structures relative to the conductive portions of housing 12. In implementations where upper housing 12A and lower housing 12B include metal housing walls, if care is not taken, the metal in the metal housing walls can block the antennas from conveying radio-frequency signals with free space in one or more positions of upper housing 12A relative to lower housing 12B. To mitigate these issues and optimize antenna performance, one or more antennas in device 10 may be mounted within clutch barrel 28 (e.g., overlapping dielectric portions of clutch barrel 28).

For example, one or more antennas may be mounted or formed at one or more locations 8 within clutch barrel 28 (e.g., on either side of a central axis of upper housing 12A and lower housing 12B). Disposing the antennas at these locations may, for example, allow the antennas to convey radio-frequency signals with free space at all orientations of upper housing 12A relative to lower housing 12B (e.g., between and including an open position and a closed position).

Figure 2:
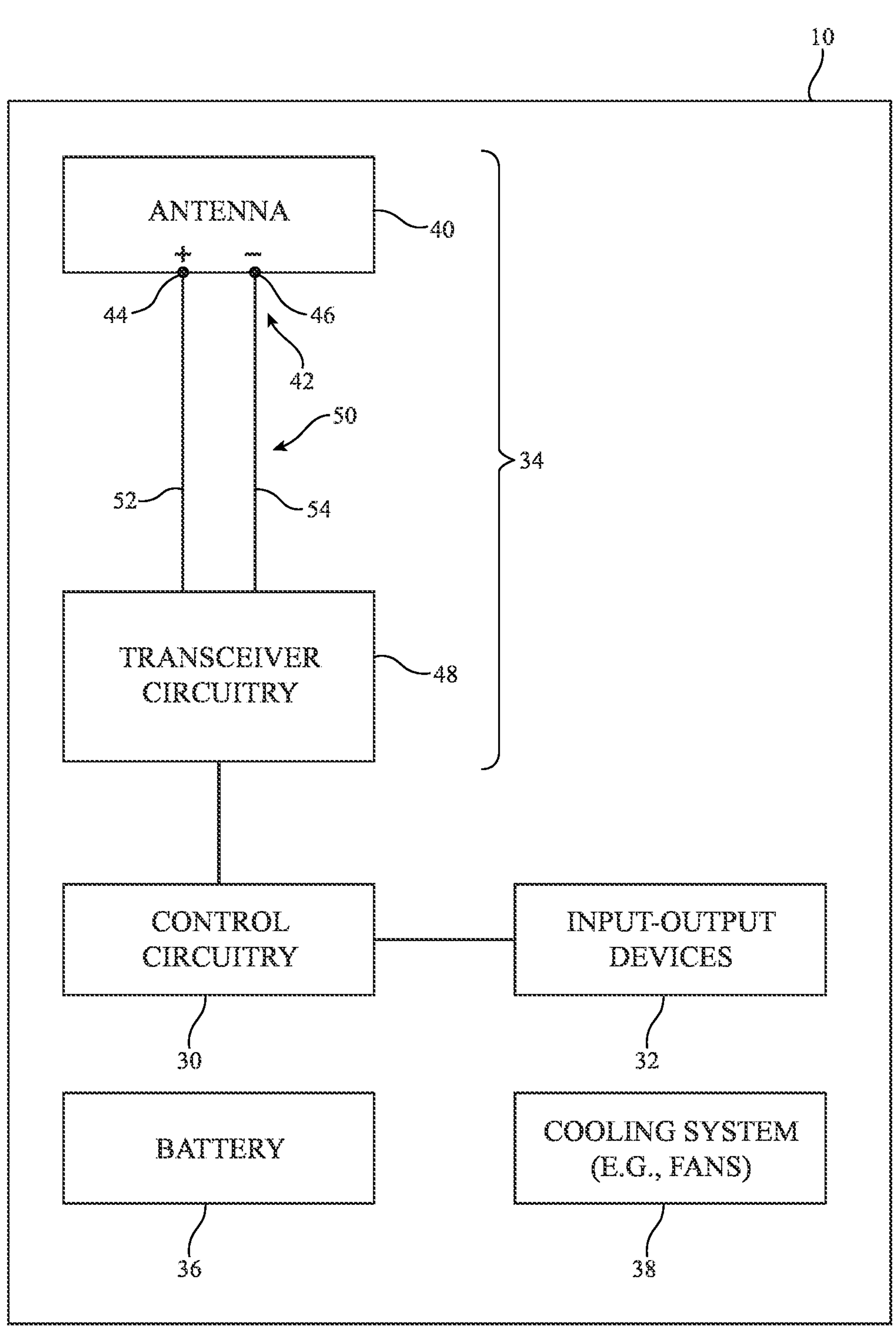
FIG. 2 is a schematic diagram of an illustrative electronic device with wireless circuitry in accordance with some embodiments.

A schematic diagram showing illustrative components that may be used in device 10 is shown in FIG. 2. As shown in FIG. 2, device 10 may include control circuitry such as control circuitry 30. Control circuitry 30 may include storage and/or processing circuitry. Storage in control circuitry 30 may include hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 30 may be used to control the operation of device 10. This processing circuitry may include one or more processors such as microprocessors, microcontrollers, digital signal processors, host processors, baseband processor integrated circuits, application specific integrated circuits, central processing units (CPUs), graphics processing units (GPUs), etc. Control circuitry 30 may be configured to perform operations in device 10 using hardware (e.g., dedicated hardware or circuitry), firmware, and/or software. Software code for performing operations in device 10 may be stored on control circuitry 30 (e.g., storage in control circuitry 30 may include non-transitory (tangible) computer readable storage media that stores the software code). The software code may sometimes be referred to as program instructions, software, data, instructions, or code. Software code stored on the storage may be executed by processing circuitry in control circuitry 30.

Control circuitry 30 may be used to run software on device 10 such as internet browsing applications, voice-over-internet-protocol (VOIP) telephone call applications, email applications, media playback applications, operating system functions, etc. To support interactions with external equipment, control circuitry 30 may be used in implementing communications protocols. Communications protocols that may be implemented using control circuitry 30 include internet protocols, wireless local area network protocols (e.g., IEEE 802.11 protocols-sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, accelerometers, proximity sensors, and other sensors and input-output components.

Device 10 may include wireless communications circuitry 34 that allows control circuitry 30 of device 10 to communicate wirelessly with external equipment. The external equipment with which device 10 communicates wirelessly may be a computer, a cellular telephone, a watch, a router, access point, or other wireless local area network equipment, a wireless base station in a cellular telephone network, a display, a head-mounted device, or other electronic equipment. Wireless communications circuitry 34 may include radio-frequency (RF) transceiver circuitry 48 and one or more antennas such as antenna 40. Configurations in which device 10 contains a single antenna may sometimes be described herein as an example. In general, device 10 may include any number of antennas.

Transceiver circuitry 48 may support communications in Extremely High Frequency (EHF) or millimeter wave communications bands between about 30 GHz and 300 GHz, in centimeter wave communications bands between about 10 GHz and 30 GHz (sometimes referred to as Super High Frequency (SHF) bands), wireless local area network (WLAN) communications bands such as the 2.4 GHz and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHz), a cellular low-midband (LMB) (e.g., 1400 to 1550 MHZ), a cellular midband (MB) (e.g., from 1700 to 2200 MHZ), a cellular high band (HB) (e.g., from 2300 to 2700 MHZ), a cellular ultra-high band (UHB) (e.g., from 3300 to 5000 MHZ, or other cellular communications bands between about 600 MHZ and about 10 THz (e.g., 3G bands, 4G LTE bands, 5G New Radio (NR) Frequency Range 1 (FR1) bands below 10 GHZ, 5G NR FR2 bands between around 10 GHZ and 100 GHZ, sub-THz, THz, or THE bands between around 100 GHZ and 10 THz such as 6G bands, etc.), a near-field communications (NFC) band (e.g., at 13.56 MHz), satellite navigations bands (e.g., an L1 global positioning system (GPS) band at 1575 MHz, an L5 GPS band at 1176 MHZ, a Global Navigation Satellite System (GLONASS) band, a BeiDou Navigation Satellite System (BDS) band, etc.), ultra-wideband (UWB) communications band(s) supported by the IEEE 802.15.4 protocol and/or other UWB communications protocols (e.g., a first UWB communications band at 6.5 GHZ and/or a second UWB communications band at 8.0 GHZ), and/or any other desired communications bands. The communications bands handled by the radio-frequency transceiver circuitry may sometimes be referred to herein as frequency bands or simply as "bands," and may span corresponding ranges of frequencies. Transceiver circuitry 48 may include one or more integrated circuits, power amplifier circuitry, low-noise input amplifiers, passive radio-frequency components, switching circuitry, transmission line structures, and other circuitry for handling radio-frequency signals.

If desired, device 10 may be supplied with a battery such as battery 36. Control circuitry 30, input-output devices 32, wireless communications circuitry 34, and power management circuitry associated with battery 36 may produce heat during operation. To ensure that these components are cooled satisfactorily, device 10 may be provided with a cooling system such as cooling system 38. Cooling system 38, which may sometimes be referred to as a ventilation system, may include one or more fans and other equipment for removing heat from the components of device 10. Cooling system 38 may include structures that form airflow ports (e.g., openings in ventilation port structures located along slot 20 of FIG. 1 or other portions of device 10 through which cool air may be drawn by one or more cooling fans and through which air that has been warmed from heat produced by internal components may be expelled). Airflow ports, which may sometimes be referred to as cooling ports, ventilation ports, air exhaust and entrance ports, etc., may be formed from arrays of openings in plastic ventilation port structures or other structures associated with cooling system 38.

Radio-frequency transceiver circuitry 48 and antenna(s) 40 may be used to handle one or more radio-frequency communications bands. For example, circuitry 48 may include wireless local area network transceiver circuitry that may handle a 2.4 GHz band for WiFi® and/or Bluetooth® communications and, if desired, may include 5 GHz transceiver circuitry (e.g., for WiFi®). If desired, transceiver circuitry 48 and antenna(s) 40 may handle communications in other bands (e.g., cellular telephone bands, near field communications bands, bands at millimeter wave frequencies, etc.).

Transceiver circuitry 48 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to free space through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna structures. For example, antennas 40 may include antennas with resonating elements that are formed from stacked patch antenna structures, loop antenna structures, patch antenna structures, inverted-F antenna structures, slot antenna structures, planar inverted-F antenna structures, monopole antenna structures, dipole antenna structures, helical antenna structures, Yagi (Yagi-Uda)

antenna structures, dielectric resonator antennas, hybrids of these designs, etc. If desired, one or more of antennas 40 may be cavity-backed antennas. Different types of antennas may be used for different bands and combinations of bands. If desired, antennas 40 may be arranged in one or more phased antenna arrays.

As shown in FIG. 2, transceiver circuitry 48 in wireless communications circuitry 34 may be coupled to antennas such as antenna 40 using radio-frequency transmission line paths such as transmission line 50. Transmission line paths in device 10 such as transmission line 50 may include coaxial cables, microstrip transmission lines, stripline transmission lines, edge-coupled microstrip transmission lines, edge-coupled stripline transmission lines, waveguide transmission lines (e.g., coplanar waveguides, grounded coplanar waveguides, etc.), transmission lines formed from combinations of transmission lines of these types, etc.

Transmission line paths in device 10 such as transmission line 50 may be integrated into rigid and/or flexible printed circuit boards if desired. In one suitable arrangement, transmission line paths in device 10 may include transmission line conductors (e.g., signal and/or ground conductors) that are integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive). Filter circuitry, switching circuitry, impedance matching circuitry, and other circuitry may be interposed within the transmission lines, if desired.

Transmission line 50 in device 10 may be coupled to antenna feed 42 of antenna 40. Antenna 40 of FIG. 2 may, for example, form an inverted-F antenna, a planar inverted-F antenna, a slot antenna, a hybrid inverted-F slot antenna or other antenna having an antenna feed such as antenna feed 42 with a positive antenna feed terminal such as positive antenna feed terminal 44 and a ground antenna feed terminal such as ground antenna feed terminal 46. Transmission line 50 may include a positive transmission line conductor 52 (sometimes referred to herein as signal conductor 52) and a ground transmission line conductor 54 (sometimes referred to herein as ground conductor 54). Signal conductor 52 may be coupled to positive antenna feed terminal 44 and ground conductor 54 may be coupled to ground antenna feed terminal 46. Other types of antenna feed arrangements may be used (e.g., indirect feed arrangements, feed arrangements in which antenna 40 is fed using multiple feeds, etc.) and multiple antennas 40 may be provided in device 10, if desired. The feeding configuration of FIG. 2 is merely illustrative.

Filter circuitry, switching circuitry, impedance matching circuitry, and other circuitry may be interposed within transmission line 50, in or between parts of antenna 40, or in other portions of wireless communications circuitry 34, if desired. Control circuitry 30 may be coupled to transceiver circuitry 48 and input-output devices 32. During operation, input-output devices 32 may supply output from device 10 and may receive input from sources that are external to device 10. Control circuitry 30 may use wireless communications circuitry 34 to transmit and receive wireless signals.

Figure 3:
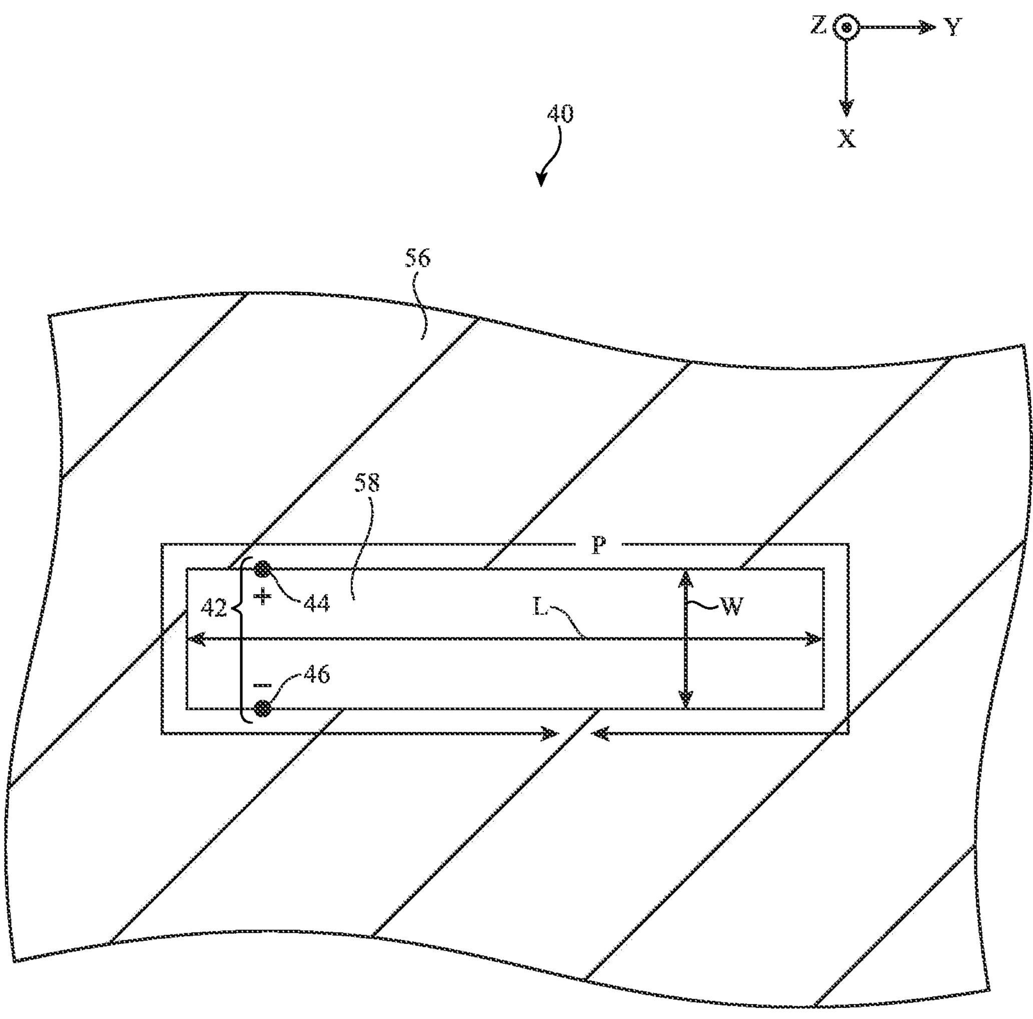
FIG. 3 is a diagram of an illustrative antenna having a radiating slot in accordance with some embodiments.

FIG. 3 is a top view of an illustrative antenna 40 for device 10. In the example of FIG. 3, antenna 40 is a slot antenna having a slot antenna resonating element 58 in an antenna ground 56 (sometimes referred to herein as ground plane 56, ground structures 56, antenna ground structures 56, or ground 56). Antenna ground 56 is formed from conductive materials such as metal portions or walls of clutch barrel 28 (FIG. 1). Slot antenna resonating element 58 is formed from a slot, notch, opening, or hole in antenna ground 56. Slot antenna resonating element 58 may be filled with air or another dielectric material.

Slot antenna resonating element 58 is sometimes also referred to herein as radiating slot 58, resonating slot 58, antenna slot 58, slot element 58, radiating slot element 58, resonating slot element 58, or simply as slot 58. In the configuration of FIG. 3, slot 58 is a closed slot, because portions of antenna ground 56 completely surround and enclose the lateral periphery of slot 58. Open slot antenna structures may also be formed in conductive materials such as antenna ground 56 (e.g., by forming an opening in the right-hand or left-hand end of antenna ground 58 so that slot 58 protrudes through antenna ground 56).

Antenna 40 may be fed by an antenna feed 42 coupled across slot 58. Positive antenna feed terminal 44 may be coupled to a first edge of slot 58 (e.g., along the length L of slot 58). Ground antenna feed terminal 46 may be coupled to a second edge of slot 58 (e.g., along the length L of slot 58) opposite the first edge. Slot 58 is an elongated slot having a longest dimension (length L) extending along a corresponding longitudinal axis (e.g., parallel to the Y-axis). Slot 58 has a width W orthogonal to length L. Width W is substantially less than length L.

In general, the frequency response of an antenna is related to the size and shapes of the conductive structures in the antenna. Slot antenna structures of the type shown in FIG. 3 tend to exhibit response peaks when slot perimeter P is equal to the wavelength of operation of the antenna (e.g., where perimeter P is equal to two times length L plus two times width W). Antenna currents may flow between antenna feed terminals 44 and 46 around perimeter P of slot 58. The distance between antenna feed 42 and the narrower edge of slot 58 may be selected to match the impedance of antenna 40 to the impedance of the corresponding transmission line (e.g., transmission line 50 of FIG. 2).

In scenarios where slot 58 is a closed slot, length L may be approximately equal to (e.g., within 15% of) one-half of a wavelength of operation of the antenna (e.g., a wavelength of a fundamental mode of the antenna). Harmonic modes of slot 58 may also be configured to cover desired frequency bands. In scenarios where slot 58 is an open slot, length L may be approximately equal to one-quarter of the wavelength of operation.

The frequency response of slot 58 can be tuned using one or more tuning components and/or impedance matching circuitry (not shown). These components may have terminals that are coupled to opposing sides of slot 58 and/or to antenna feed 42. The example of FIG. 3 is merely illustrative. In general, slot 58 may have any desired shape (e.g., where the perimeter P of slot 58 defines radiating characteristics of the antenna). For example, slot 58 may have a meandering shape with any desired number of straight and/or curved segments and/or may have any desired number of straight and/or curved edges defined by antenna ground 56.

In the example of FIG. 3, slot 58 is illustrated as a two dimensional planar slot that is confined to a single two-dimensional plane (e.g., the X-Y plane). If desired, slot 58 may also have a non-zero height and may extend along a third dimension (e.g., parallel to the Z-axis). In these implementations, slot 58 is sometimes also referred to as a three-dimensional radiating slot. The three-dimensional radiating slot may be integrated into conductive structures of clutch barrel 28 (FIG. 1).

Figure 4:
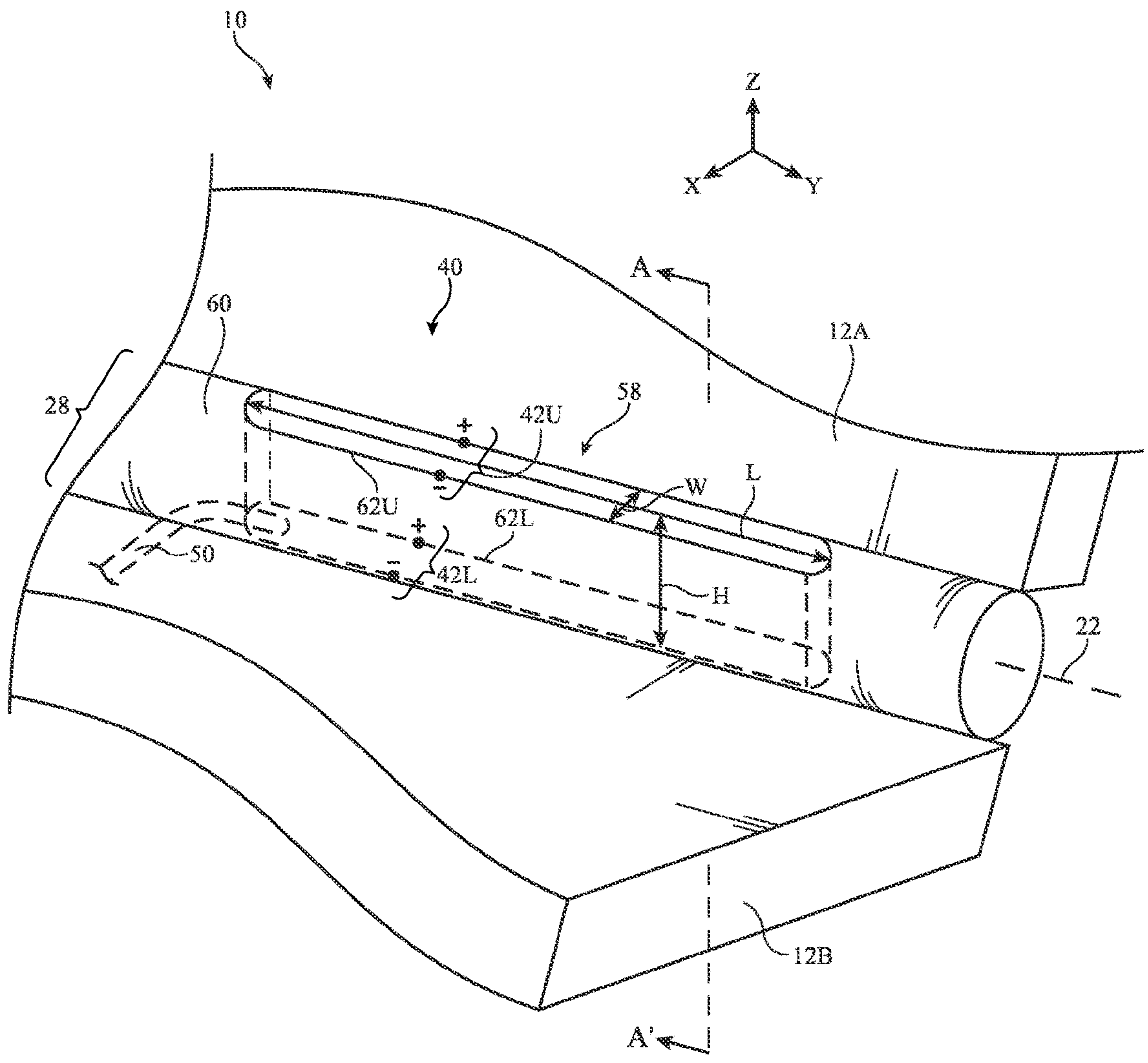
FIG. 4 is a perspective view of an illustrative antenna having a radiating slot in a clutch barrel in accordance with some embodiments.

FIG. 4 is a perspective view showing one example of how slot 58 may be a three-dimensional radiating slot integrated into conductive structures of clutch barrel 28. As shown in FIG. 4, clutch barrel 28 may join lower housing 12B to upper housing 12A. Clutch barrel 28 may, for example, protrude from the interior volume of lower housing 12B towards upper housing 12A. Clutch barrel 28 may include conductive clutch barrel structures such as clutch barrel conductor 60. Clutch barrel conductor 60 may include one or more metal housing walls of clutch barrel 28, for example. Clutch barrel conductor 60 may have a cylindrical shape and may form a shaft that extends along hinge axis 22 (e.g., clutch barrel conductor 60 may have a longitudinal axis parallel to or aligned with hinge axis 22). Clutch barrel conductor 60 may wrap around hinge axis 22. While referred to herein as a clutch barrel conductor, clutch barrel conductor 60 may include multiple different conductors that are electrically coupled together (e.g., multiple joined or coupled metal clutch barrel housing walls).

Clutch barrel conductor 60 may form the antenna ground 56 (FIG. 3) for antenna 40. Antenna 40 may include a slot 58 that is cut, punched, stamped, drilled, etched, or otherwise disposed in clutch barrel conductor 60. Slot 58 may be a three-dimensional radiating slot that extends between multiple openings 62 at the exterior surface of clutch barrel conductor 60. The exterior surface of clutch barrel conductor 60 may be curved. For example, slot 58 may extend from an upper opening 62U at the upper end of clutch barrel conductor 60 (e.g., at, facing, adjacent to, and/or overlapping upper housing 12A), through the conductive material of clutch barrel conductor 60, to an opposing lower opening 62L at the lower end of clutch barrel conductor 60 (e.g., at, facing, adjacent to, and/or overlapping lower housing 12B and/or the bottom side of device 10).

Upper opening 62U and lower opening 62L may each lie within or at the exterior surface of clutch barrel conductor 60. Upper opening 62U and/or lower opening 62L may therefore lie in one or more curved surfaces (rather than being planar openings). Alternatively, one or both of upper opening 62U and lower opening 62L may lie in a plane. Openings 62U and 62L are sometimes also referred to herein as slots, notches, gaps, or apertures. In this way, slot 58 may form a three-dimensional slot that extends from a first surface at upper opening 62U (e.g., a first curved surface) and that includes a cavity, shaft, or tunnel extending through the thickness of clutch barrel 28 to a second surface at lower opening 62L (e.g., across the diameter of the clutch barrel). Slot 58 may therefore have a height H orthogonal to its length L and width W. Height H may extend across all or substantially all of the diameter of clutch barrel conductor 60 (e.g., parallel to the Z-axis).

Slot 58 may be fed at any desired location along upper opening 62U, along lower opening 62L, or along the tunnel in clutch barrel conductor 60 between upper opening 62U and lower opening 62L. As one example, slot 58 may be fed by an antenna feed 42U coupled across upper opening 62U. In this example, antenna currents are conveyed between the antenna feed terminals along the perimeter of upper opening 62U, causing upper opening 62U to resonate/radiate. This produces wireless radio-frequency signals that propagate into free space above device 10. At the same time, some of the radio-frequency signals also propagate down the tunnel of slot 58 to lower opening 62L (e.g., the tunnel of slot 58 may serve as a radio-frequency waveguide), which passes the radio-frequency signals to free space below device 10 (e.g., lower opening 62L may form a window or aperture for the radio-frequency signals conveyed by antenna 40).

As another example, slot 58 may be fed by an antenna feed 42L coupled across lower opening 62L. In this example, antenna currents are conveyed between the antenna feed terminals along the perimeter of lower opening 62L, causing lower opening 62L to resonate/radiate. This causes radio-frequency signals to propagate into free space below device 10. At the same time, some of the radio-frequency signals also propagate up the tunnel of slot 58 to upper opening 62U (e.g., the tunnel of slot 58 may serve as a radio-frequency waveguide), which passes the radio-frequency signals to free space above device 10 (e.g., upper opening 62U may form a window or aperture for the radio-frequency signals conveyed by antenna 40). As another example, slot 58 may be fed by both antenna feed 42L and antenna feed 42U. Antenna feed(s) 42 may be fed using one or more corresponding transmission lines 50 extending into clutch barrel 28 from lower housing 12B.

Since upper housing 12A rotates relative to clutch barrel 28 about hinge axis 22, the location of upper housing 12A relative to upper opening 62U may change over time, depending on how the user orients upper housing 12A for viewing display 14 (FIG. 1). On the other hand, the location of lower housing 12B relative to lower opening 62L remains fixed over time. Care should therefore be taken to ensure that slot 58 is able to convey radio-frequency signals in all directions around device 10 regardless of the orientation of upper housing 12A relative to lower housing 12B. As one example, slot 58 may include a linear tunnel that extends between upper opening 62U and lower opening 62L and that is laterally offset from upper housing 12A when upper housing 12A is in a closed position.

Figure 5:
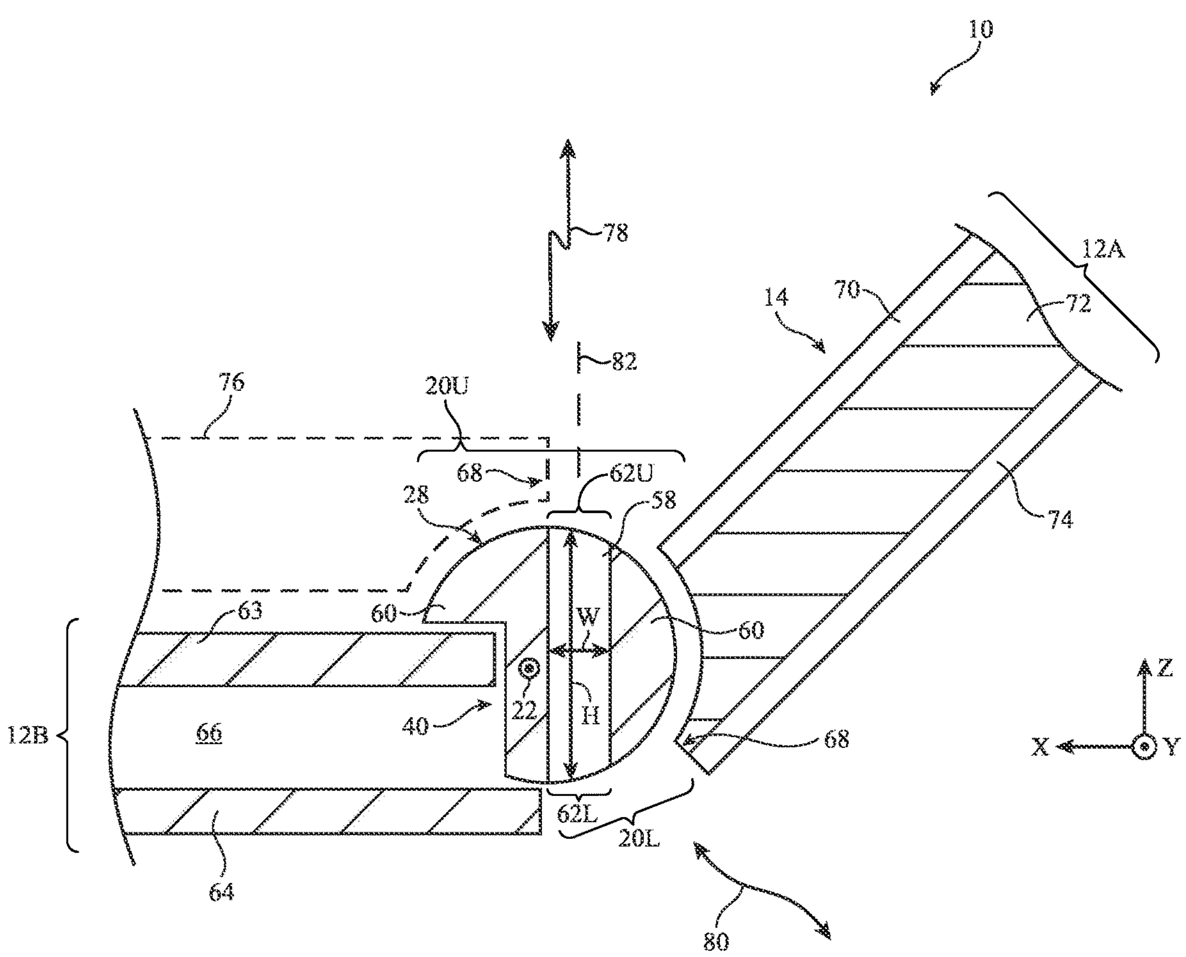
FIG. 5 is a cross-sectional side view of an illustrative electronic device having a linear radiating slot in a clutch barrel in accordance with some embodiments.

FIG. 5 is a cross-sectional side view showing how slot 58 may include a linear tunnel that extends between upper opening 62U and lower opening 62L and that is laterally offset from upper housing 12A when upper housing 12A is in a closed position (e.g., as taken along line AA' of FIG. 4). As shown in FIG. 5, lower housing 12B may have an upper metal wall 63 and a lower metal wall 64 that surround and enclose an interior volume 66 of lower housing 12B. Keyboard 16 and track pad 18 of FIG. 1 may be mounted to metal wall 63 of lower housing 12B.

Clutch barrel conductor 60 may be mounted to lower housing 12B to form the clutch barrel 28 of device 10. If desired, clutch barrel conductor 60 may be grounded or shorted to one or both of upper metal wall 62 and lower metal wall 64 using one or more conductive interconnect structures (e.g., conductive screws, conductive adhesive, conductive gaskets, etc.). This may hold metal walls 63 and 64 and clutch barrel conductor 60 to a common ground potential (e.g., to form part of the antenna ground for antenna 40). The curved exterior surface of clutch barrel conductor 60 may protrude vertically above upper metal wall 63 of lower housing 12B if desired.

Slot 58 in clutch barrel conductor 60 may include a linear tunnel (cavity) of height H extending from upper opening 62U at the upper side of clutch barrel 28 to lower opening 62L at the lower side of clutch barrel 28. Slot 58 may, if desired, have a uniform width W across the height H of slot 58. In other words, the slot 58 may vertically extend along a linear vertical axis 82 (e.g., orthogonal to hinge axis 22). Vertical axis 82 may extend parallel to the Z-axis (e.g., orthogonal to the lateral surface of lower housing 12B, which lies in the X-Y plane) or may be tilted at a non-zero angle relative to the Z-axis (e.g., slot 58 may be tilted at a non-orthogonal angle with respect to the lateral surface of lower housing 12B).

Figure 6:
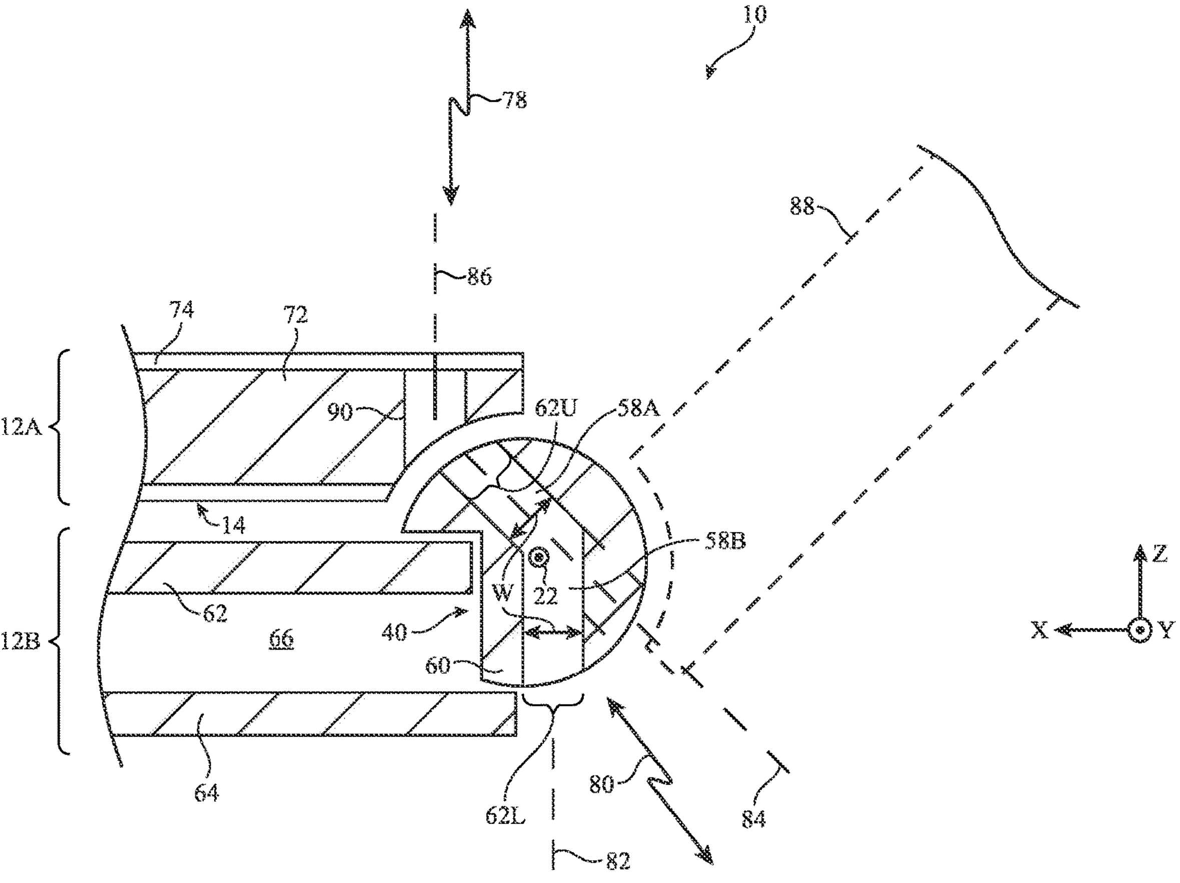
FIG. 6 is a cross-sectional side view of an illustrative electronic device having an angled radiating slot in a clutch barrel in accordance with some embodiments.

Upper housing 12A may be mounted (e.g., hingeably coupled) to clutch barrel 28. Housing 12A may be rotated between an open position, as shown in FIG. 6, and a closed position 76. When in the open position, there is both an upper slot (gap) 20U between upper metal wall 63 of lower housing 12B and upper housing 12A and a lower slot (gap) 20L between lower metal wall 64 of lower housing 12B and upper housing 12A. Lower slot 20L may be defined between a lower edge 68 of upper housing 12A and lower metal wall 64 of lower housing 12B, for example. Slot 58 may convey radio-frequency signals through upper opening 62U and upper slot 20U, as shown by arrow 78 (e.g., within a first field of view out the front of device 10 when upper housing 12A is in the open position). Slot 58 may concurrently convey radio-frequency signals through lower opening 62L and lower slot 20L, as shown by arrow 80 (e.g., within a second field of view out the back of device 10 when upper housing 12A is in the open position).

As upper housing 12A rotates about hinge axis 22 to intermediate angles between the open position and closed position 76, the size of upper slot 20U decreases (thereby decreasing the first field of view of antenna 40 through upper slot 20U) and the size of lower slot 20L increases (thereby increasing the second field of view of antenna 40 through lower slot 20L). The cumulative field of view of antenna 40 through upper slot 20U and lower slot 20L may remain substantially constant over time (e.g., as high as 180 degrees or more). This may, for example, help to allow antenna 40 to maintain consistent levels of wireless performance and a stable wireless link with external equipment even as upper housing 12A is rotated to closed position 76 and even as the preferred viewing angle for the display on device 10 changes for a given user (or between users) over time.

When upper housing 12A is in closed position 76, upper slot 20U is removed and lower slot 20L exhibits a maximum area (field of view). However, as shown in FIG. 5, slot 58 may be laterally offset from metal walls 63 and 64 of lower housing 12B and/or hinge axis 22 such that upper housing 12A does not overlap upper opening 62U and slot 58 when in closed position 76. Slot 58 may, for example, be sufficiently offset from metal walls 63 and 64 such that the lower edge 68 of upper housing 12A is aligned with the edge of upper opening 62U or such that the lower edge 68 of upper housing 12A is laterally offset from upper opening 62U when upper housing 12A is in closed position 76. This may allow slot 58 to continue to convey radio-frequency signals within the first field of view out the front of device 10, as shown by arrow 78, even when upper housing 12A is in closed position 76.

As shown in FIG. 5, display 14 may be mounted to upper housing 12A. Upper housing 12A may include conductive structures 72. Conductive structures 72 may include conductive portions of display 14 (e.g., a conductive display frame, conductive display shielding, conductive portions of feed or driver flexes for the display, pixel circuitry, etc.), a conductive frame of upper housing 12A, and/or conductive housing walls of upper housing 12A (e.g., peripheral conductive housing structures that surround a lateral periphery of display 14). Conductive structures 72 may include a curved edge, wall or surface facing clutch barrel 28 (e.g., extending from lower edge 68 to display 14). The curved edge may lie in a surface that extends parallel to the curved exterior surface of clutch barrel conductor 60 if desired.

If desired, display 14 may include dielectric cover layers such as a front cover layer 70 and a rear cover layer 74 overlapping conductive structures 72. Front cover layer 70 and rear cover layer 74 may be formed from dielectric materials such as glass, sapphire, ceramic, plastic, etc. Display 14 may emit light (e.g., display images) through front cover layer 70 (e.g., front cover layer 70 may form a display cover layer of display 14). If desired, rear cover layer 74 may be provided with an opaque masking layer (e.g., a thin ink layer or another cosmetic layer or trim) that helps to hide conductive display structures and/or components within upper housing 12A from view. Front cover layer 70 is sometimes also referred to as a front glass or front cover glass. Rear cover layer 74 is sometimes also referred to as a back glass or back cover glass.

The example of FIG. 5 in which slot 58 is a linear slot and in which upper opening 62U is aligned with lower opening 62L (e.g., when viewed in the −Z direction) is merely illustrative. If desired, slot 58 may be a non-linear slot having a non-linear or bent tunnel that extends between upper opening 62U and lower opening 62L (e.g., upper opening 62U may be tilted, offset, or non-aligned with respect to lower opening 62L). FIG. 6 is a cross-sectional side view showing how slot 58 may include a non-linear or bent tunnel that extends between upper opening 62U and lower opening 62L. In the example of FIG. 5, upper housing 12A is shown in the closed position for the sake of illustration. Upper housing 12A may be rotated from the closed position to open position 88.

As shown in FIG. 6, upper opening 62U may be angularly offset or misaligned with respect to lower opening 62L (e.g., upper opening 62U may be centered at a first angle about hinge axis 22 whereas lower opening 62L is centered at a second angle about hinge axis 22, where the first angle and the second angle or separated by an angular difference other than 180 degrees such as 120-150 degrees, 100-160 degrees, 90-170 degrees, etc.). Slot 58 may include a first portion 58A (e.g., a first tunnel portion or segment) that extends from upper opening 62U along a first vertical axis such as vertical axis 84 (e.g., the first vertical axis may form a longitudinal axis of the first tunnel portion orthogonal to the longitudinal axis of the slot, which extends parallel to hinge axis 22). Slot 58 may also include a second portion 58B (e.g., a second tunnel portion or segment) that extends from first portion 58A to lower opening 62L along a second vertical axis such as vertical axis 82 (e.g., the second vertical axis may form a longitudinal axis of the second tunnel portion orthogonal to the longitudinal axis of the slot). Vertical axis 84 and thus portion 58A of slot 58 may be tilted at a non-parallel angle with respect to vertical axis 82 and thus portion 58B of slot 58 (e.g., 20-90 degrees, 45-80 degrees, 30-85 degrees, 30-60 degrees, 20-70 degrees, 45 degrees, 60 degrees, etc.).

Tilting slot 58 at upper opening 62U in this way may help to redirect the first field of view of antenna 40 (e.g., at the front side of device 10) farther away from upper housing 12A in open position 88, thereby optimizing antenna performance when upper housing 12A is in the open position. If desired, upper housing 12A may include a tunnel 90 in conductive structures 72. Tunnel 90 is sometimes also referred to herein as cavity 90, waveguide 90, slot 90, or aperture 90. Tunnel 90 may extend from the front face of upper housing 12A to the rear face of housing 12A (e.g., from rear cover layer 74 to the curved lower edge of upper display 12A or front cover layer 70).

Tunnel 90 may overlap and/or align with upper opening 62U when upper housing 12A is in the closed position. During signal transmission, slot 58 may transmit radio-frequency signals through upper opening 62U and tunnel 90, as shown by arrow 78. During signal reception, tunnel 90 may receive radio-frequency signals (as shown by arrow 78) and may pass the radio-frequency signals into slot 58 through upper opening 62U. Tunnel 90 may extend along a vertical axis 86 when upper housing 12A is in the closed position (e.g., parallel to vertical axis 82, parallel to the Z-axis, or tilted at a non-parallel angle relative to vertical axis 82 and/or the Z-axis). In this way, tunnel 90 may propagate radio-frequency signals to and/or from upper opening 62U and slot 58 (e.g., tunnel 90 may form a radio-frequency waveguide for antenna 40) when upper housing 12A is in the closed position (as shown by arrow 78). This may help to maintain the first field of view of antenna 40 out the front of device 10 when upper housing 12A is in the closed position despite the presence of conductive structures 72 in upper housing 12A.

Tunnel 90 may be filled with air or another dielectric (e.g., RF transparent) material. Rear cover layer 74 and/or front cover layer 70 may laterally overlap one or both ends of tunnel 90. Since rear cover layer 74 and front cover layer 70 are formed from dielectric materials, the radio-frequency signals conveyed by upper opening 62U may pass through the cover layers into and out of tunnel 90. If desired, one or more opaque masking layers or ink layers under rear cover layer 74 and/or front cover layer 70 may help to hide tunnel 90 from view. Tunnel 90 may laterally extend along the longitudinal axis of slot 58 (e.g., parallel to the Y-axis and hinge axis 22).

Figure 7:
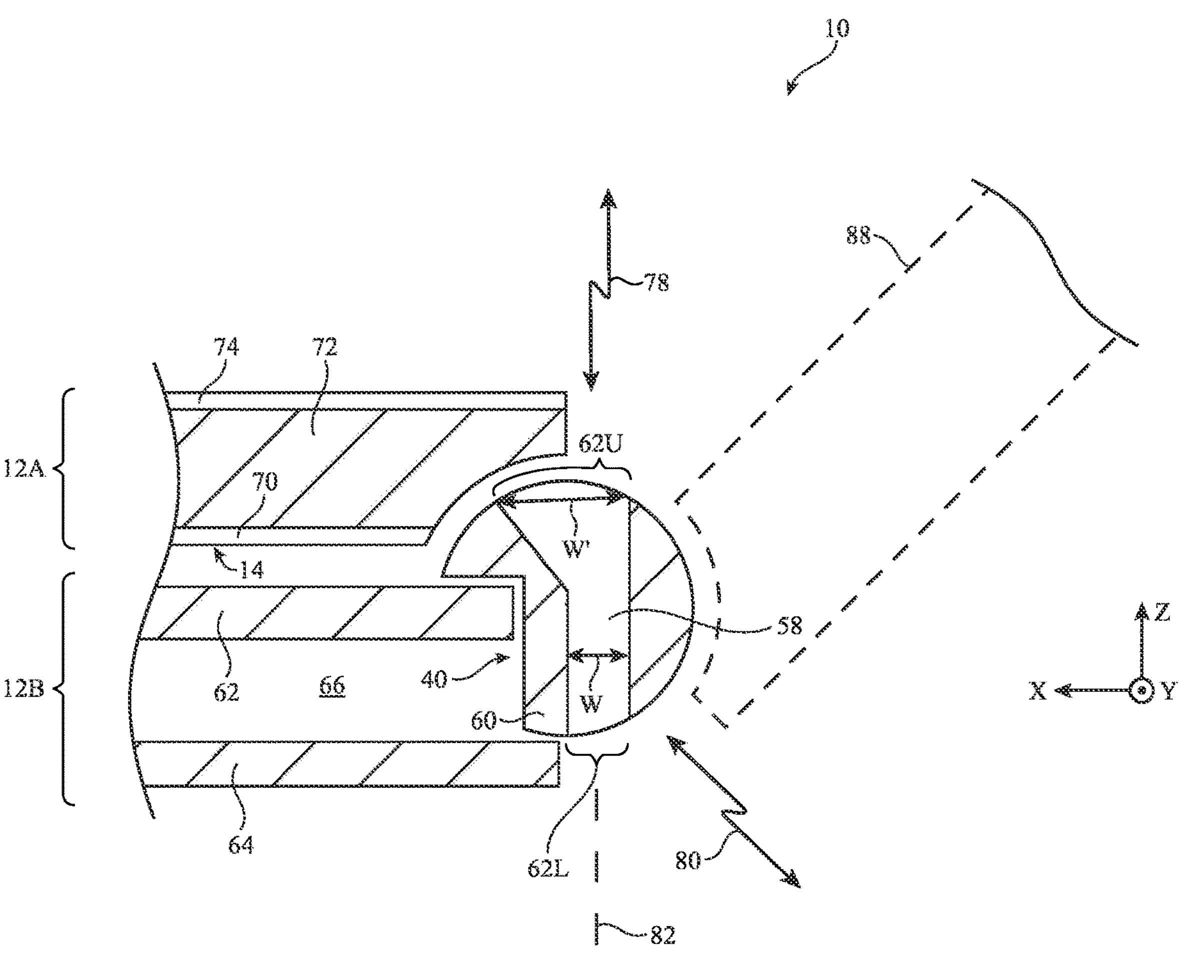
FIG. 7 is a cross-sectional side view of an illustrative electronic device having a tapered radiating slot in a clutch barrel in accordance with some embodiments.

In the example of FIG. 6, slot 58 has a uniform width W across upper opening 62U, portion 58A of slot 58, portion 58B of slot 58, and lower opening 62L. This is merely illustrative. If desired, slot 58 may have a tapered shape extending from lower opening 62L to upper opening 62U. FIG. 7 is a cross-sectional side view showing one example of how slot 58 may have a tapered shape extending from lower opening 62L to upper opening 62U. As shown in FIG. 7, lower opening 62L may have width W whereas upper opening 62U has an expanded width W' that is wider than width W. The width of the tunnel of slot 58 may increase (taper) from lower opening 62L to upper opening 62U. The width may increase gradually, linearly, continuously, in a step-like manner, or in any other desired manner.

Slot 58 may be fed at lower opening 62L in this example (e.g., using antenna feed 42L of FIG. 4). This produces a peak electric field along the portion of the tunnel of slot 58 having width W, where the tapered portion of the tunnel of slot 58 serves as a radiating waveguide and/or a radio-frequency horn that propagates the radio-frequency signals radiated by the peak electric field out upper opening 62U. By increasing the width of upper opening 62U in this way, some of upper opening 62U may remain exposed to free space in each orientation of upper housing 12A relative to lower housing 12B, ensuring that slot 58 is still able to convey radio-frequency signals over at least some of the first field of view out the front of device 10 regardless of the orientation of upper housing 12A, including when upper housing 12A is in the closed position (as shown by arrow 78).

The examples of FIGS. 5-7 are merely illustrative. In general, the tunnel of slot 58 may have any desired number of curved and/or straight edges/walls (e.g., as defined by the interior edges of clutch barrel conductor 60) from upper opening 62U to lower opening 62L. The tunnel of slot 58 may have any desired number of straight and/or curved segments. If desired, the tunnel of slot 58 may follow a meandering path from upper opening 62U to lower opening 62L. The example of FIGS. 5-7 in which clutch barrel conductor 60 is illustrated as a solid piece of metal is merely illustrative. If desired, clutch barrel conductor 60 may be formed from a hollow piece of metal.

Figure 8:
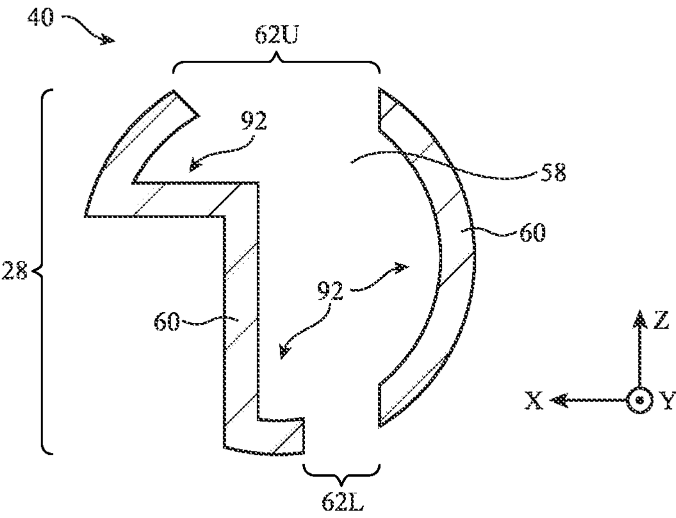
FIG. 8 is a cross-sectional side view of an illustrative electronic device having a radiating slot in a hollowed clutch barrel in accordance with some embodiments.

FIG. 8 is a cross-sectional side view of clutch barrel 28 showing one example of how clutch barrel conductor 60 may be formed from a hollow piece of metal. As shown in FIG. 8, clutch barrel conductor 60 may be formed from one or more hollow pieces of metal (e.g., folded and/or stamped sheet metal members) having recesses such as hollow portions 92 as the tunnel of slot 58 extends from upper opening 62U to lower opening 62L. This may, for example, serve to reduce the overall weight of device 10 without affecting antenna performance. In the example of FIG. 8, upper opening 62U has width W' of FIG. 7. However, clutch barrel conductor 60 may be hollowed in this way when slot 58 has an angled tunnel (as shown in FIG. 6), a linear tunnel (as shown in FIG. 5), or any other shape.

Figure 9:
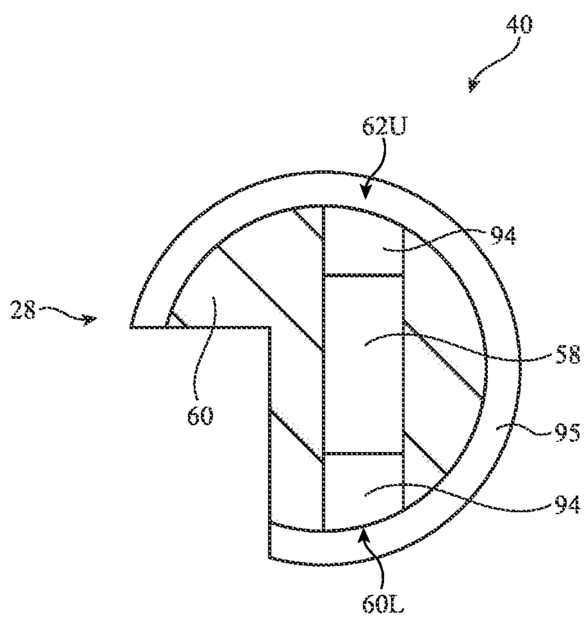
FIG. 9 is a cross-sectional side view of an illustrative clutch barrel having a radiating slot and a dielectric cover layer in accordance with some embodiments.

If desired, dielectric material may be disposed on or within clutch barrel conductor 60 to help protect slot 58 and thus antenna 40 from detuning, damage, and/or contaminants. FIG. 9 is a cross-sectional side view of clutch barrel 28 illustrating some examples of how dielectric material may be disposed on or within clutch barrel conductor 60. As shown in FIG. 9, clutch barrel conductor 60 may be provided with a dielectric cover layer such as dielectric cover layer 95. Dielectric cover layer 95 may be layered onto the curved exterior surface of clutch barrel conductor 60. Dielectric cover layer 95 may therefore be a curved dielectric cover layer. Dielectric cover layer 95 may cover upper opening 62U, lower opening 62L, or both upper opening 62U and lower opening 62L. Dielectric cover layer 95 may be formed from plastic or ceramic, as examples. If desired, clutch barrel 28 may include a first dielectric cover layer 95 that overlaps upper opening 62U and a second dielectric cover layer 95 (e.g., formed from the same material or a different material) that overlaps lower opening 62L. If desired, clutch barrel 28 may be provided with multiple concentric (stacked) dielectric cover layers 95.

Additionally or alternatively, dielectric material 94 may be disposed within slot 58 at upper opening 62U and/or at lower opening 62L. Dielectric material 94 may extend through only some of the tunnel of slot 58 or may completely fill the tunnel of slot 58. Dielectric material may include plastic (e.g., injection molded plastic), epoxy, or other materials. If desired, dielectric material 94 may be disposed in one of openings 62U or 62L whereas the other opening is covered by dielectric cover layer 95. If desired, one or both of openings 62U and 62L may be filled with dielectric material 94 and covered with dielectric cover layer 95. Slot 58 may be provided with dielectric material 94 and/or dielectric cover layer 95 when slot 58 has any of the shapes shown or described herein (e.g., in connection with FIGS. 5-8).

Figure 10:
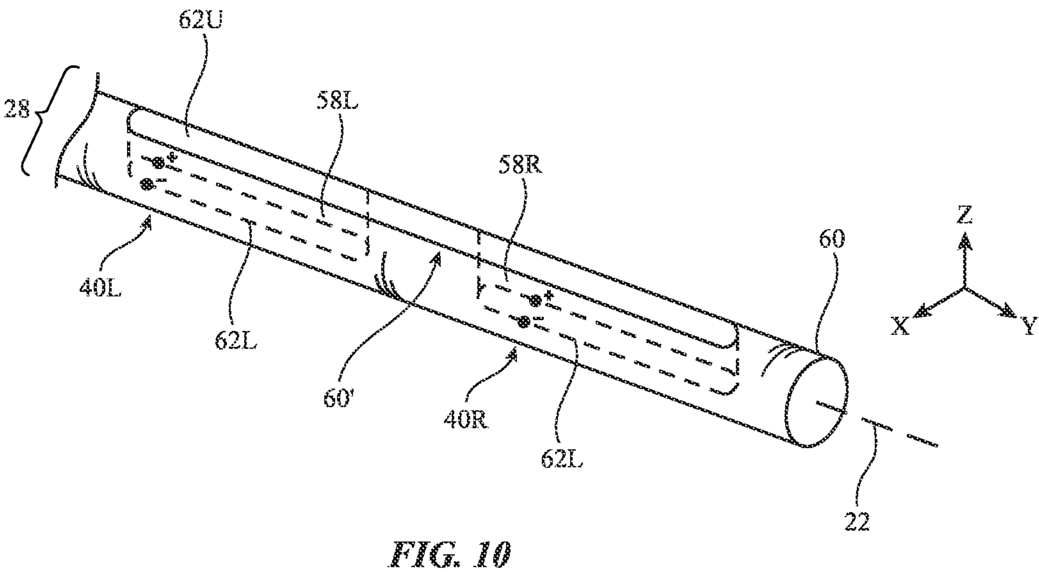
FIG. 10 is a perspective view of an illustrative clutch barrel having multiple radiating slots that extend to a shared opening in accordance with some embodiments.

If desired, clutch barrel 28 may include multiple antennas having respective lower openings 62L but that share a single upper opening 62U. FIG. 10 is a perspective view of clutch barrel 28 showing an example in which clutch barrel 28 includes a first (left) antenna 40L having a first slot 58L and that includes a second (right) antenna 40R having a second slot 58R formed in clutch barrel conductor 60, where antennas 40L and 40R share the same upper opening 62U.

As shown in FIG. 10, slot 58L may include a first tunnel that extends vertically from a first lower opening 62L to upper opening 62U. Slot 58R may include a second tunnel that extends vertically from a second lower opening 62L to the same upper opening 62U. A portion 60' of clutch barrel conductor 60 may electrically separate (isolate) slot 58L and thus antenna 40L from slot 58R and antenna 40R. Upper opening 62U may be covered and/or filled with a single piece of dielectric material (e.g., dielectric cover layer 95 or dielectric material 94 of FIG. 9) to help make slots 58R and 58L appear as a single continuous opening in clutch barrel 28. Alternatively, slots 58L and 58R may extend from different respective upper openings 62U to the same shared lower opening 62L. This may be generalized to any desired number of antennas 40 in clutch barrel 28 sharing any desired number of upper openings 62U and/or lower openings 62R.

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. A laptop computer comprising:

a lower housing having an upper metal wall and a lower metal wall that define an interior volume of the lower metal housing;

a clutch barrel mounted to the lower housing, the clutch barrel having a conductor, a first opening in the conductor, a second opening in the conductor, and a tunnel that extends from the first opening to the second opening through the conductor;

an upper housing coupled to the clutch barrel by a hinge; and an antenna having an antenna feed coupled across the first opening in the conductor.

2. The laptop computer of claim 1, wherein the hinge has a hinge axis, the first opening has a longitudinal axis parallel to the hinge axis, and the tunnel extends along a first axis orthogonal to the longitudinal axis.

3. The laptop computer of claim 2, wherein the conductor has a diameter orthogonal to the longitudinal axis and the tunnel extends across the diameter of the conductor.

4. The laptop computer of claim 2, wherein the tunnel has a linear shape from the first opening to the second opening.

5. The laptop computer of claim 4, wherein the upper housing is rotatable from an open position to a closed position, the upper housing being non-overlapping with respect to the first opening, the tunnel, and the second opening when the upper housing is in the closed position.

6. The laptop computer of claim 2, wherein the tunnel comprises:

a first portion that extends, along the first axis, from the second opening; and a second portion that extends, along a second axis non-parallel to the first axis, from the first portion to the first opening.

7. The laptop computer of claim 6, wherein the upper housing is rotatable from an open position to a closed position, the upper housing comprising:

a display;

conductive structures; and a waveguide in the conductive structures, the waveguide being aligned with the second opening when the upper housing is in the closed position.

8. The laptop computer of claim 2, wherein the first opening has a first width and the second opening has a second width greater than the first width.

9. The laptop computer of claim 8, wherein the upper housing is rotatable from an open position to a closed position, the upper metal wall of the lower housing is separated from the upper housing by a first slot when the upper housing is in the open position, the lower metal wall of the lower housing is separated from the upper housing by a second slot when the upper housing is in the open position, the second opening faces the first slot, and the first opening faces the second slot.

10. The laptop computer of claim 1, wherein the upper housing is rotatable from an open position to a closed position, the upper metal wall of the lower housing is separated from the upper housing by a first slot when the upper housing is in the open position, the lower metal wall of the lower housing is separated from the upper housing by a second slot when the upper housing is in the open position, the second opening faces the first slot, and the first opening faces the second slot.

11. The laptop computer of claim 1, wherein the upper housing is rotatable from an open position to a closed position, the upper metal wall of the lower housing is separated from the upper housing by a first slot when the upper housing is in the open position, the lower metal wall of the lower housing is separated from the upper housing by a second slot when the upper housing is in the open position, the second opening faces the second slot, and the first opening faces the first slot.

12. A laptop computer comprising:

a lower housing having an upper metal wall and a lower metal wall that define an interior volume of the lower metal housing;

a clutch barrel mounted to the lower housing and having a conductor;

an upper housing coupled to the clutch barrel by a hinge, wherein the upper housing is rotatable between an open position and a closed position, the upper metal wall of the lower housing is separated from the upper housing by a first gap when the upper housing is in the open position, and the lower metal wall of the lower housing is separated from the upper housing by a second gap when the upper housing is in the open position; and an antenna having a radiating slot in the conductor of the clutch barrel, wherein the radiating slot lies in a curved surface and is configured to radiate through the first gap and the second gap when the upper housing is in the open position.

13. The laptop computer of claim 12, wherein the radiating slot faces the first gap, the conductor has an opening facing the second gap, and the conductor has a cavity that extends from the radiating slot to the opening.

14. The laptop computer of claim 12, wherein the radiating slot faces the second gap, the conductor has an opening facing the first gap, and the conductor has a cavity that extends from the radiating slot to the opening.

15. The laptop computer of claim 14, wherein the cavity has a linear shape from the radiating slot to the opening and the opening is non-overlapping with respect to the upper housing when the upper housing is in the closed position.

16. The laptop computer of claim 14, wherein the upper housing has conductive structures, the upper housing has a radio-frequency waveguide in the conductive structures, and the opening overlaps the radio-frequency waveguide when the upper housing is in the closed position.

17. The laptop computer of claim 14, wherein the cavity has a first segment that extends from the radiating slot along a first axis, the cavity has a second segment that extends from the first segment to the opening along a second axis, and the second axis is non-parallel to the first axis.

18. The laptop of claim 14, further comprising:

a dielectric cover layer disposed on the conductor, wherein the dielectric cover layer covers the radiating slot and the opening.

19. An electronic device comprising:

a housing having an upper housing portion that contains a display and having a lower housing portion, wherein the lower housing portion has opposing first and second conductive walls;

a clutch barrel mounted to the lower housing portion;

a hinge that couples the upper housing portion to the lower housing portion at the clutch barrel, the upper housing portion being rotatable with respect to the lower housing portion, the hinge having a hinge axis, and the clutch barrel having a diameter orthogonal to the hinge axis;

a conductor in the clutch barrel, wherein the conductor extends along the hinge axis and has an opening; and an antenna having a radiating slot that extends to the opening across the diameter of the clutch barrel.

20. The electronic device of claim 19, wherein the lower housing portion has an upper metal wall, the lower housing portion has a lower metal wall, the upper metal wall is separated from the upper housing portion by a first gap when the upper housing portion is in an open position, the lower metal wall is separated from the upper housing portion by a second gap when the upper housing portion is in the open position, the radiating slot faces the second gap, the opening faces the first gap, and the electronic device further comprises:

an additional antenna having an additional radiating slot that faces the second gap, that is separated from the radiating slot by a portion of the conductor, and that extends to the opening across the diameter of the clutch barrel.

* * * * *